Dec. 18, 1956     E. B. TIDD     2,774,848
CONTROL MEANS FOR A HEATING SYSTEM
Original Filed June 24, 1947     3 Sheets-Sheet 1
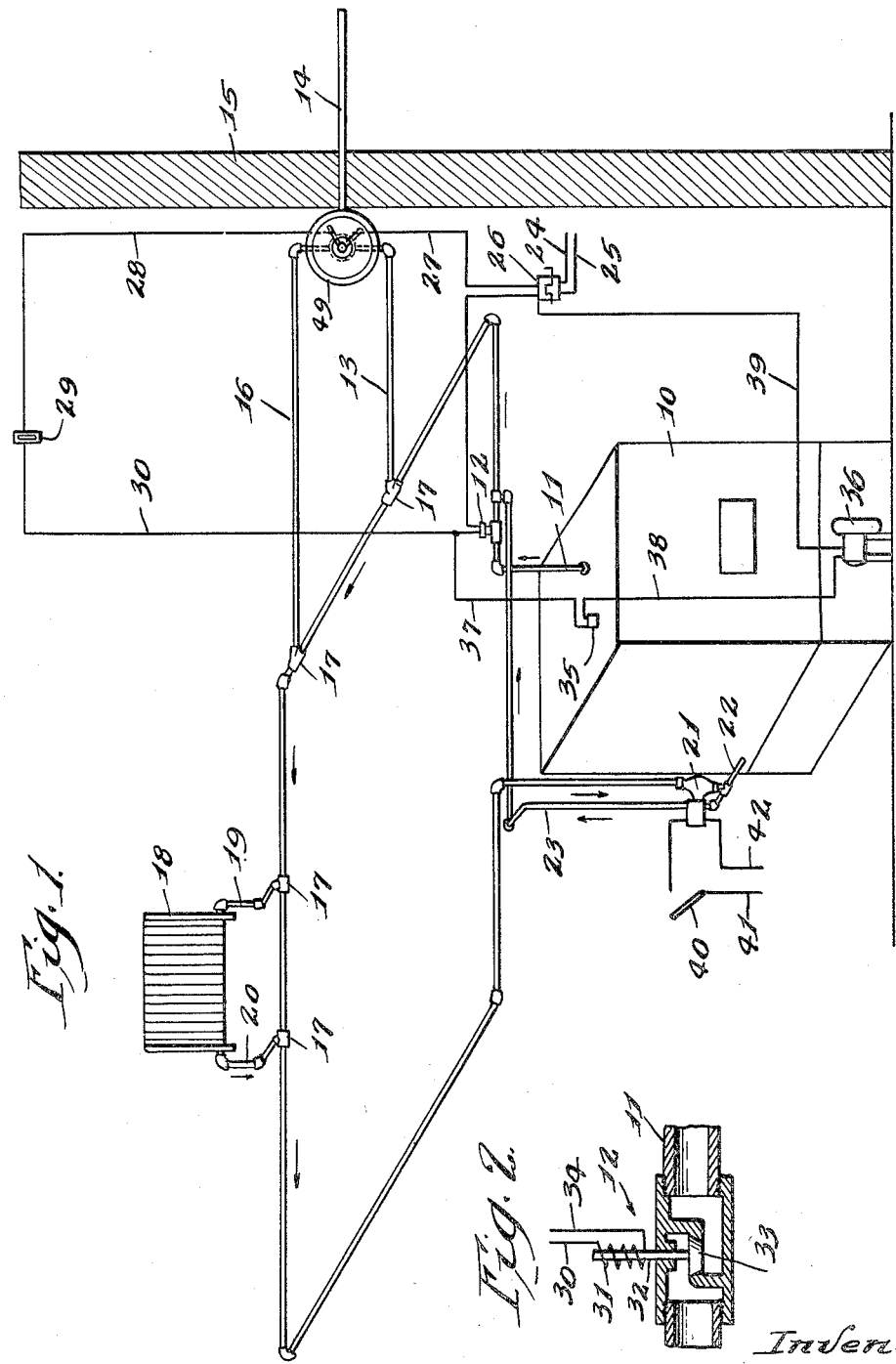

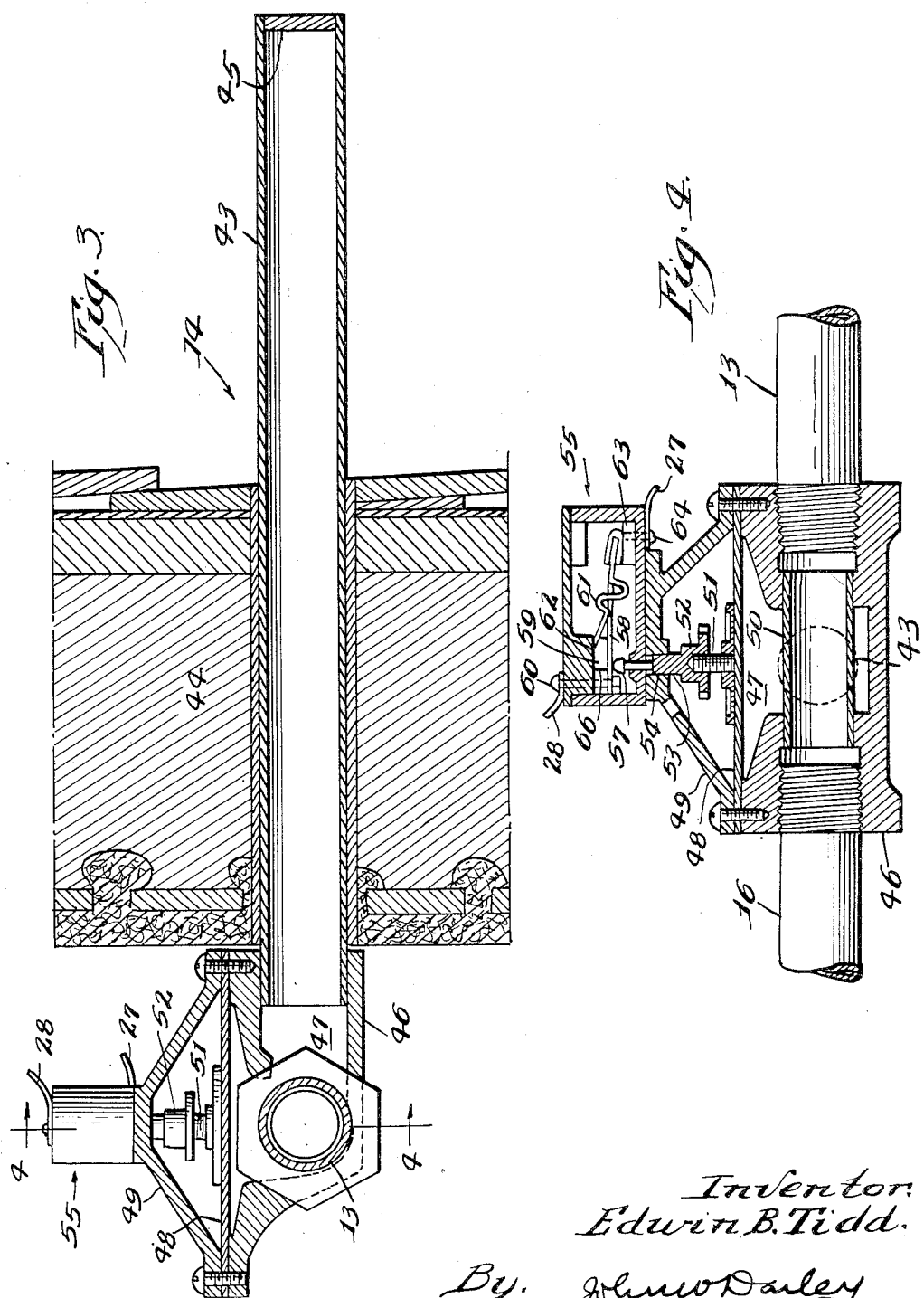

Dec. 18, 1956  E. B. TIDD  2,774,848
CONTROL MEANS FOR A HEATING SYSTEM
Original Filed June 24, 1947  3 Sheets-Sheet 3

Inventor:
Edwin B. Tidd.
By John W Darley
Attorney.

United States Patent Office 2,774,848
Patented Dec. 18, 1956

2,774,848

CONTROL MEANS FOR A HEATING SYSTEM

Edwin B. Tidd, Mount Prospect, Ill., assignor to Bell & Gossett Company, Morton Grove, Ill., a corporation of Illinois Original application June 24, 1947, Serial No. 756,615, now Patent No. 2,626,755, dated January 27, 1953. Divided and this application January 16, 1953, Serial No. 331,646

3 Claims. (Cl. 200—140)

My invention relates to a control means for a heating system and more particularly to a construction and arrangement thereof which efficiently and economically maintains a substantially uniform temperature in the space to be heated regardless of variations in the external weather conditions.

For purpose of disclosure, the invention will be described in connection with a forcibly circulated, hot water heating system, but it will be understood that the invention is applicable to any fluid heated system including those utilizing hot air and steam, and without regard to the method of firing the heat source, i. e., boiler or furnace. The latter, regarded generally as a reservoir of heating medium, may therefore be fired with liquid, gaseous or solid fuels and, in the case of solid fuels, the firing may be by hand or automatically controlled.

To insure maximum body comfort in any given space, it is important that the heating system maintain a substantially constant temperature condition in the space. In other words, the temperature throughout a room should be as nearly uniform as possible so that there will be a minimum temperature differential between the floor and the ceiling. During the heating season, every such space is subject to a heat loss which varies with changes in the external weather conditions and unless this loss is compensated by a heat supply under conditions of continuous balance, it is obvious that the space will not be heated properly. Factors which influence this loss for any given installation are the outdoor temperature, rain, snow, sun and wind. The heat loss therefore will be greater during periods of severe weather than on mild days and, importantly, as between windy and still days having the same tempertaure, the heat loss will be greater on the windy days. Hence, a heating system which is not sufficienly flexible to handle these variations will fall short of providing adequate heat under all conditions.

The problem involved can be readily understood by considering the limitations of a common type of forcibly circulated, hot water heating system. A minimum temperature is maintained in the boiler of such a system by an "aquastat" connected to the firing device and the pump is controlled by a room thermostat set to theoretically maintain a desired temperature in the space being heated. Heat supply to the space is therefore intermittent and this condition renders impossible any close regulation of the desired temperature. Not only is there a considerable lag between the heating of the radiators and the response of the thermostat, but the inertia of the system is such that when the thermostat opens, the radiators have been heated to a temperature higher than the conditions require, thus resulting in a waste of heat. Moreover, when the pump stops, the convection circulation of air in the room gradually slows down and the air stratifies. If, for example, the thermostat is set for 70° F., the temperature at the level of the thermostat may be of this order, but near the ceiling the temperature will be several degrees higher and near the floor the temperature will be several degrees lower. This condition, known as "cold 70°," is objectionable in that it produces body discomfort and is not rectified until air circulation is restored in the room by a fresh supply of heat to the radiators. This correction is not only temporary, but produces the overheated situation noted above. With a system of this type, it is accordingly impossible to maintain a continuous balance between heat loss and heat supply and therefore a close regulation of the desired temperature, because there is no control factor which is intimately and directly affected by changes in outside weather conditions which determine the rate of heat loss.

Attempts to solve the above problem generally have taken two forms. In one type, controlling devices have been connected through small diameter tubes to bulbs respectively exposed to the heating fluid and to the outside air, the bulbs and tubes being filled with a heat expansible liquid whose pressure changes as the temperatures to which they are subjected vary. Such an arrangement is responsive to temperature changes only and is incapable of responding to variations in heat loss on windy days due to the negligible heat conduction along the small diameter tubes. In the second type, the outdoor control is associated with means for producing heat electrically in such a manner that the rate of heat dissipation of the heat will vary with wind and outside temperature changes and will exercise a compensating control on the heating system. Both of these arrangements, however, are relatively costly and not within reach of the owners of small homes.

It is therefore one object of my invention to devise a control means for a heating system which is arranged for close regulation of the heat demand in the space being heated in accordance with outdoor weather changes by correlating the effect of outdoor and system fluid temperatures.

A further object is to provide a control means having the foregoing characteristics which is further conditioned for response to the increased demands that occur on windy days during the heating season.

A further object is to provide an outdoor control for regulating a heating system in which the operation of a circuit controlling switch mechanism is determined by simultaneously exposing opposite ends of a heat conducting tube to the heating fluid and the outside air, the heat conditioning of the casing by these temperatures determining the extent of the control and the device being therefore responsive to outdoor temperature and wind varations.

A further object is to provide a control means as above indicated which is adjustable to establish a desired temperature of the circulating heating fluid to satisfy the heat demands of the space being heated in relation to any outdoor temperature.

These and further objects of the invention will be set forth in the following specification, reference being had to the accompanying drawings, and the novel means by which said objects are effectuated will be definitely pointed out in the claims.

This application is a division of my copending application for Heating System, Serial No. 756,615, filed June 24, 1947, now U. S. Letters Patent No. 2,626,755, dated January 27, 1953.

In the drawings:

Fig. 1 is a schematic, isometric elevation of a one-pipe, hot water heating system equipped in accordance with one phase of the invention and in which the circulating pump runs continuously during the heating season.

Fig. 2 is a diagrammatic, sectional elevation of a solenoid operated valve which operates as a flow control member in the system shown in Fig. 1.

Fig. 3 is a sectional elevation of one form of outdoor control which may be employed with the system shown in Fig. 1 and which utilizes a gas or liquid filled casing that is responsive to outside weather conditions and the heating fluid, the control being rotated through 90° from the position shown in Fig. 1 for convenience in illustration.

Fig. 4 is a section along the line 4—4 in Fig. 3.

Figure 5:
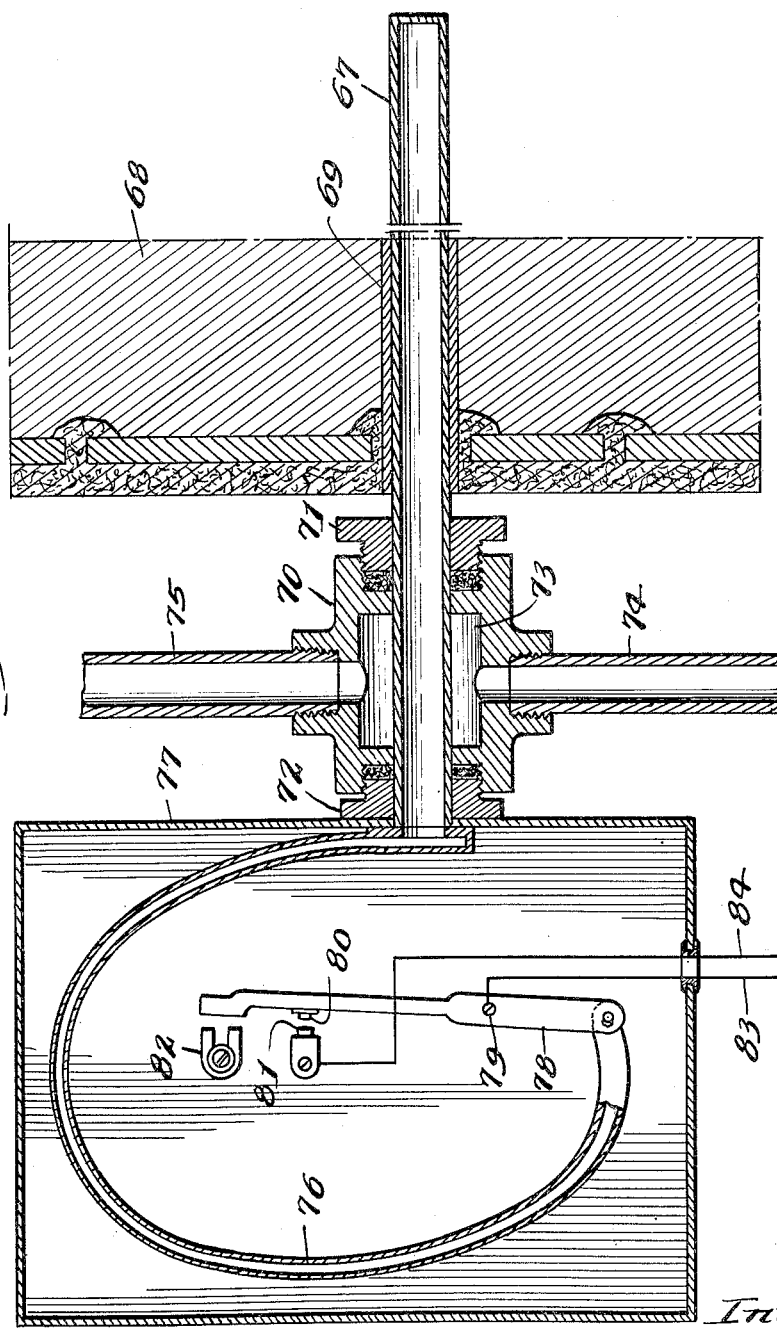
Fig. 5 is a sectional elevation showing a further modification of the outdoor control using a gas or liquid filled casing as in Fig. 3 and associating this casing with a Bourdon tube and switching elements.

Referring to Figs. 1 and 2, the numeral 10 designates a hot water heating boiler from which leads a supply pipe 11 in which is interposed a flow control element in the form of an electrically operated valve, denoted generally by the numeral 12. By way of example, this valve is indicated as being of the solenoid operated type, but a motor operated valve may be used if desired, many types of the latter valve being well known in the art. On the discharge side of the valve 12, a pipe 13 connects the pipe 11 with the water inlet of an outdoor control 14 which extends through the building wall 15 a distance sufficient to insure that its outside extremity will be subject to weather changes, although as presently noted the position of the control is capable of being varied. The water outlet of the control 14 is connected by a pipe 16 with the pipe 11, the water inlet and outlet being located inwardly of the wall 15. To insure adequate water flow through the inner end of the control so that the regulating action of the latter will be accurate and substantial, the pipes 13 and 16 are connected to the pipe 11 by fittings 17 which are specially designed for one-pipe systems and embody the principles outlined in United States Letters Patent No. 1,663,271, dated March 20, 1928.

The pipe 11 is connected to any desired number of radiators, such as 18, and each radiator is connected by supply and return pipes 19 and 20 to the pipe 11 through fittings 17 for reasons noted in connection with the control 14. The return portion of the pipe 11 delivers the water to an electrically operated pump 21 whose discharge side is connected by a pipe 22 with the boiler and by a pipe 23 with the pipe 11 between the discharge side of the valve 12 and the connection of the pipe 13 with the pipe 11. Hence, when the valve 12 is closed, the pipe 23 serves as a bypass around the boiler 10, all water then being circulated through the pipe 23 by the pump 21 which runs continuously during the heating season.

Associated with the above piping is an electric circuit which includes the outdoor control 14 as a part thereof and which will now be described. Power wires 24 and 25 are connected to a main switch 26 and from the switch a wire 27 leads to the control 14 whose interior construction is more particularly illustrated in Fig. 3 and will be presently described. A wire 28 connects the control 14 with a room thermostat 29 positioned to be affected by the radiator 18 and a wire 30 connects the thermostat with a solenoid coil 31 (see Fig. 2) operably related to the stem 32 of a valve element 33 which controls flow through the valve 12. The coil 31 is also connected by a wire 34 with the switch 26, the control 14, thermostat 29 and the electrical portion of the valve 12 being therefore arranged in series so that when the control and thermostat are closed, the valve 12 is open to permit hot water to flow from the boiler.

Bridged around the valve 12 is a circuit which includes in series relation a high limit or safety "aquastat" 35 mounted in the boiler and responsive to the boiler water temperature, and automatically operated, firing means 36 for the boiler which may be a gas or oil burner, or a mechanical stoker. The "aquastat" 35 is connected by a wire 37 with the wire 30, while a wire 38 connects the "aquastat" with the firing means and the latter is connected by a wire 39 with the switch 26. Since the "aquastat" 35 is always closed under normal operating conditions, it will be obvious that the firing means 36 will be operated simultaneously with the opening of the valve 12 when the thermostat 29 is closed since the firing means and the valve, respectively, are electrically in series with the thermostat 29 and the control 14. Operation of the pump 21 is determined by a switch 40 which controls a circuit supplied by power wires 41 and 42.

The control 14 is more particularly illustrated in Figs. 3 and 4 to which reference will now be made. Specifically, the control comprises a heat conducting, tubular casing 43, composed of a metal such as brass or copper, which extends through the wall 15 with its opposite ends projecting beyond opposite sides of the wall, this being the specific position shown in Fig. 1, but is not a limiting position. Preferably, the casing 43 is heat insulated from the wall 15 by a sleeve 44 and its outer or weather end is closed by a plug 45.

The inner end of the casing 43 is mounted in an open top housing 46 located inwardly of the wall 15 and which includes a chamber 47 that communicates with the interior of the casing, the housing 46 having heat exchange relation to the indicated end of the casing 43. The top of the housing 46 is closed by a diaphragm 48 clamped thereagainst by a frustoconical cover 49 and the casing 43 and chamber 47 are filled with a suitable gas or liquid sealed in at any desired temperature and pressure. Hence, the diaphragm 48 is responsive to pressure changes of the fluid in the casing 43. Air may be used as a fill, or any of the well known, heat expansible liquids which will not freeze at any of the outdoor temperatures to which the control might be subjected. Bridged across the chamber 47 and in heat exchanging relation with the fluid therein and the housing 46 is a tube 50 (see Fig. 4) which is preferably composed of copper or a comparable heat conducting metal and which communicates with the ends of pipes 13 and 16 mounted in the housing 46 and connected to the heating system as shown in Fig. 1.

A threaded stem 51 is fixed to the central part of the top surface of the diaphragm 48 and adjustable on the stem is a nut 52 having an extension 53 which is reciprocable through a hole 54 in the cover 49 and moves with the diaphragm. The extension 53 is intended to actuate a snap switch 55 which is preferably of the type which requires only a very slight movement to shift the switching element from a first to a second position and when the actuating force is removed, the element automatically returns to the first position. A switch of this type is disclosed in United States Letters Patent No. 1,960,020, dated May 22, 1934, and its essential details are illustrated in Fig. 4. Generally speaking, upward movement of the diaphragm 48, corresponding to a lessened demand for heat, effects an opening of the switch 55, while a contrary movement, corresponding to an increased demand for heat, effects a closing of the switch.

The switch 55 comprises a housing 56 composed of insulating material and through whose bottom is slidably mounted a plunger 57 which is actuated upward by the extension 53. The upper end of the plunger is operably related to an electrically conducting, spring leaf 58 whose left end is secured to a shim 59 which abuts the cover of the housing 56 by means of a screw 60 in conducting relation to the spring leaf 58 and the wire 28 is connected to the screw. Integrally formed with the opposite or free end of the spring leaf 58 and extending in spaced relation on opposite sides of and toward the fixed end of the leaf is a pair of members 61, each of which is shaped in the manner shown in Fig. 4, and the free end of each member freely seats within a socket 62 in the shim 59 so that the members may rock upwardly and downwardly relative to the shim. Only one of the members 61 is illustrated in Fig. 4. The switch is shown in closed position with the free end of the spring leaf 58 resting on a metallic block 63 secured to the bottom of the housing 56 by a screw 64 which is in electrically conducting relation to the block and to the screw is connected one end of the wire 27. When the plunger 57 is moved upwardly, the spring leaf 58 is snapped upwardly to place its free end in contact with a block 65 secured to the cover of the housing 56 which is the open circuit position of the switch. This movement of the leaf spring 58 is permitted by a slot 66 cut in the shim 59 which provides clearance for the flexing of the spring. When pressure on the plunger 57 is relieved sufficiently, the spring leaf 58 automatically returns to the closed circuit position shown in Fig. 4. For further structural details of the switch 56 and the theory of its operation, reference may be had to the last noted patent.

From the foregoing, it will be understood that, since the casing 43 is heat conducting, the pressure of the fluid therein varies in response to the mutually modifying actions of the circulating heating medium, the outside temperature, and general weather conditions with accompanying movements of the diaphragm 48 so that means are provided for regulating the heating system. The control 14 may be adjusted to meet different operating conditions by changing the position of the nut 52 and by varying the length of the casing 43 that is exposed outdoors by slipping the casing inwardly and outwardly of the wall 15, or by a combination of these factors, and including a position in which the outer end of the casing does not project beyond the outer surface of the wall. As shown in the drawings, the casing 43 is sized to present a substantial surface to the wind and weather and, being composed of metal, is characterized by a substantial heat conductance.

In describing the operation of the above system, it will be assumed that the control 14 has been adjusted to maintain a desired temperature in the space to be heated; this adjustment once made for an installation need not be disturbed for thereafter its operation is automatic. So long as heat is not required indoors, for example during the summer season, the control 14 and the thermostat 29 are open, the valve 12 and the "aquastat" 35 are closed, and the firing means 36 is not operating. Under these conditions, the control 14 is open because the outside temperature is such that the fluid pressure in the casing 43 is sufficiently high to open the switch 55. The switch 40 is also open so that the pump 21 is not running.

When the outdoor temperature falls to a point at which heat is required indoors, for example, at the beginning of the heating season when the boiler is cold, the switch 40 is closed thus initiating a flow of water through the system. This switch may be closed manually, or automatically by an outdoor thermostat set to close at an outside temperature which will insure that the pump runs continuously during the heating season, and the diagrammatic illustration of the pump circuit in Fig. 1 is intended to be generically inclusive of either arrangement. Due to the drop in the outside temperature, fluid pressure in the casing 43 decreases enough to close the controlling circuit through the switch 55, and the thermostat 29 is closed since it is then demanding heat. The control circuit is therefore completed so that the valve 12 opens to permit flow through the boiler 10 and the firing means 36 begins operating.

As the temperature of the water in the system rises, the heat thereof is applied to the inner end of the casing 43 and is conducted therealong towards the colder, outer end of the casing. This heat conductance provides the control factor for the system and it will be obvious that its rate will be higher on cold than on mild days and, further, that the dissipation of heat at the outdoor end of the casing will be higher on windy than on still days even though the windy and still days may register the same temperature on a thermometer. In other words, a higher water temperature in the system will be required to open the switch 55 on cold days than on milder days and a comparable situation will exist on windy, cold days in relation to still, cold days. The hot and cold ends of the casing 43 may be regarded as mutually modifying forces whose actions are correlated or coordinated by the casing and its effect on the contained fluid to produce an efficient control on the system which substantially balances the heat supply and the heat loss under variant weather conditions.

For example, under the conditions mentioned above and assuming an outside temperature of 65° F., a water temperature of 90° F. may be sufficient to interrupt the circuit, thus closing the valve 12 and stopping the firing means 36, even though the thermostat 29 is not satisfied. However, the heat then in the system continues to be circulated through the radiators since the pump runs continuously and moves the water through the bypass 23. As heat is dissipated in the space being heated, this condition is reflected in a lowered water temperature at the inner end of the control 14 and therefore a reduction in the fluid pressure in the casing 43. Hence, the control 14 again closes to cause a fresh supply of hot water from the boiler 10 to enter the system, this supply being slightly tempered by the relatively colder water moving through the bypass 23. Eventually, the rise in system water temperature effects an opening of the control 14 with accompanying results noted above. These repeated supplies of hot water from the boiler continue until the thermostat 29 is satisfied and thereafter heat water always courses through the system, thus eliminating stratification of air in the space being heated and avoiding the possibility of a "cold 70°" condition.

If the outdoor temperature drops to 0° F., the firing means 36 will operate and the valve 12 will open for longer periods to thereby establish the higher water temperature required to satisfy the increased heat demand in the space and the control 14 before the latter opens.

It is contemplated that the thermostat 29 would be used in well insulated buildings and might be omitted in those where the heat loss is more rapid and, in the latter case, the control 14 would determine directly the operation of the valve 12 and the firing means 36.

The foregoing means of control effectively anticipates heat demands in the space under all weather conditions and due to the principle of coordinating heat conduction along the casing 43, it is characterized by the outstanding advantage relative to bulb systems of control of compensating for increased heat losses on windy days. Further, the control 14 is more compact than the bulb arrangement and is capable of easier association with a heating system.

A further form of outdoor control, which may be used with the system shown in Fig. 1, is illustrated in Fig. 5 which is similar to that shown in Figs. 3 and 4 in that control is exercised by pressure changes in a heat expansible fluid enclosed in a heat conducting casing subjected to the outside weather and the circulating fluid of the heating system, but differs therefrom in that the casing is associated with an extension in the form of a Bourdon tube whose free end is connected to a circuit controlling switch.

Referring to Fig. 5, the numeral 67 designates a heat conducting casing which extends through and projects beyond opposite sides of a building wall 68 and is insulated therefrom by a sleeve 69. The outer or weather end of the casing is closed and the opposite end extends through a housing 70 whose opposite ends are closed by plugs 71 and 72 which encircle the casing. Between the plugs, the housing 70 is annularly chambered, as at 73, and through this chamber flows heating system fluid in heat exchanging relation to the casing 67, the fluid being supplied and evacuated through pipes 74 and 75, respectively, which are connected to the heating system shown in Fig. 1 in the manner indicated for the pipes 13 and 16, respectively.

The casing 67 extends beyond the plug 72 and is secured to one end of a Bourdon tube 76, this end therefore constituting the fixed end of the tube whose interior communicates with the interior of the casing. The tube may be enclosed in a suitable housing 77 and its free end is connected to one end of a metallic switch lever 78 pivoted at 79 in the housing. The lever carries an electrical contact 80 which when the lever is rocked to a closed position engages a fixed contact 81 supported by the housing 77. A fixed magnet 82, also carried by the housing, is disposed adjacent the free end of the lever to accelerate its movement in a direction to engage the contacts 80 and 81. Wires 83 and 84 connect the fulcrum 79 and the fixed contact 81, respectively, to the electrical circuit shown in Fig. 1, the wires 83 and 84 corresponding, respectively, to the wires 27 and 28. Since the disclosure of the switch mechanism in the housing 77 is largely diagrammatic, it will be understood that the pivot 79, contact 81 and magnet 82 will be suitably insulated from the housing, and the lever 78 will also be insulated from the connected end of the tube 76.

The casing 67 and tube 76 are filled with a suitable gas or liquid which is sealed in the indicated members and its operating characteristics therefore will be similar to the Fig. 3 type, but modified by the tube 76. The circuit controlling lever 78 is shown in open position indicating satisfied heat demand in the space being heated. When the fluid in the casing 67 and tube 76 chills sufficiently to effect a contraction of the tube, the lever 78 will be rocked to close the contacts 80 and 81 and the ensuing action will be the same as described for Fig. 3. The characteristics of this modification in relation to the heating system and its ability to coordinate the effects of the outside weather, including wind action, and the heating fluid temperatures on a heat conducting casing are identical with the form shown in Fig. 3. It is contemplated that the Fig. 5 modification, due to the use of a Bourdon tube and the connected lever, will be characterized by an increased mechanical advantage for the purpose of circuit control relative to the form shown in Fig. 3. Adjustment is effected by varying the length of the casing 67 exposed to the outside weather and its endwise position relative to the housing 70. The Bourdon tube is regarded as the equivalent of any extensible chamber, such as a bellows, which encloses a fluid and one end of which is free to move in response to pressure variations in the fluid.

The above controls are not restricted to use with the system shown in Fig. 1, but may be used with other system and suggested examples thereof are disclosed in my copending application noted above. A heating system which is associated with any of the above controls according to the arrangements shown will be conditioned to maintain an indoor temperature that is satisfactory for maximum body comfort. A substantial balance is maintained between heat supply and heat loss and there is always a sufficient amount of heat in the radiators to insure circulation of warm air in the room, thus preventing stratification. Closer regulation of the desired temperature in the room is therefore possible, as compared with the present indoor system of control, and heat demands which obviously vary with changes in the weather are efficiently handled by my improved construction which anticipates the interior requirements for heat. Moreover, stand-by heat losses of the boiler are held to a minimum because the firing periods of the firing means are elastically related to the demands for heat in the space being heated, lower temperatures in the boiler being possible on mild days than on colder days, thus enabling certain economies in overall operation.

An outstanding feature of the invention is the use of a heat conducting casing or tube as the correlating factor between the outside temperatures and those of the heating fluid. The use of such a casing enables the structure to respond to increased heat demands on windy days since the dissipation of heat along the casing will be clearly greater than on still days even though the respective outdoor temperatures are identical. This variation in heat dissipation or rate of heat loss conditions the casing to provide the required control regardless of the type employed.

Where either of the above controls is employed in a hand fired system, they would be connected to the boiler or furnace dampers for regulating the burning rate of the fuel.

I claim:

1. Control means for a piped, fluid heating system for regulating the temperature of the space to be heated comprising a heat conducting casing enclosing a sealed in fluid and having one end arranged for exposure to outdoor, relatively low temperatures, pipe means adapted for connection to the heating system for directing the relatively high temperature, heating system fluid into heat exchange relation with the casing fluid in and for applying heat to a relatively concentrated area of the opposite end of the casing, and means responsive to pressure variations in the casing fluid effected by the mutually modifying actions of the relatively high and low temperatures for determining the supply of heat to the space.

2. Control means for a piped, fluid heating system for regulating the temperature of the space to be heated comprising a heat conducting casing having one end arranged for exposure to outdoor, relatively low temperatures and the opposite end extended to form a Bourdon tube, the casing and tube enclosing a sealed in fluid, pipe means adapted for connection to the heating system for directing the relatively high temperature, heating system fluid into heat exchange relation with the casing fluid in and for applying heat to a relatively concentrated area of the opposite end of the casing adjacent its connection with the tube, movements of the free end of the tube being occasioned by pressure variations in the casing fluid effected by the mutually modifying actions of the relatively high and low temperatures, and electrical switch means operably related to the free end of the tube for determining the supply of heat to the space.

3. Control means for a piped, fluid heating system for regulating the temperature of the space to be heated comprising a heat conducting casing having one end arranged for exposure to outdoor, relatively low temperatures, an extensible chamber communicating with the opposite end of the casing, the casing and chamber enclosing a sealed in fluid, pipe means adapted for connection to the heating system for directing the relatively high temperature, heating system fluid into heat exchange relation with the casing fluid in and for applying heat to a relatively concentrated area of the opposite end of the casing adjacent its connection with the chamber, movements of the free end of the chamber being occasioned by pressure variations in the casing effected by the mutually modifying actions of the relatively high and low temperatures, and electrical switch means operably related to the free end of the chamber for determining the supply of heat to the space.

References Cited in the file of this patent

UNITED STATES PATENTS

| | | |
|---|---|---|
| 1,636,191 | McCabe | July 19, 1927 |
| 1,720,901 | Ileman | July 16, 1929 |
| 2,066,700 | Slough | Jan. 5, 1937 |
| 2,249,418 | Chambers | July 15, 1941 |
| 2,258,042 | Brace | Oct. 7, 1941 |